(12) United States Patent
Fujino

(10) Patent No.: US 8,265,084 B2
(45) Date of Patent: Sep. 11, 2012

(54) LOCAL NETWORK CONNECTING SYSTEM LOCAL NETWORK CONNECTING METHOD AND MOBILE TERMINAL

(75) Inventor: Shozo Fujino, Tokyo (JP)

(73) Assignee: NEC Corporation, Tokyo (JP)

( * ) Notice: Subject to any disclaimer, the term of this patent is extended or adjusted under 35 U.S.C. 154(b) by 1823 days.

(21) Appl. No.: 11/331,182

(22) Filed: Jan. 13, 2006

(65) Prior Publication Data
US 2006/0153211 A1    Jul. 13, 2006

(30) Foreign Application Priority Data
Jan. 13, 2005    (JP) .................. 2005-006832

(51) Int. Cl.
| | |
|---|---|
| H04L 12/56 | (2006.01) |
| H04L 12/28 | (2006.01) |
| H04L 29/02 | (2006.01) |
| H04M 3/00 | (2006.01) |
| H04M 1/00 | (2006.01) |
| G06F 15/16 | (2006.01) |
| G06F 3/048 | (2006.01) |
| G06F 12/02 | (2006.01) |

(52) U.S. Cl. ............ 370/395.54; 370/389; 370/392; 370/401; 370/474; 379/355.02; 379/355.04; 379/280; 709/217; 709/218; 709/219; 709/245; 711/200

(58) Field of Classification Search .......... 370/352, 370/399, 395.54, 395.53, 401, 395.3, 395.2, 370/389, 392, 409, 474, 475; 379/221.14, 379/258, 280, 355.02, 355.04; 340/1.1–16.1; 362/24; 709/217–219, 245; 710/3; 711/1–6, 711/200–221

See application file for complete search history.

(56) References Cited

U.S. PATENT DOCUMENTS

| | | | | |
|---|---|---|---|---|
| 6,226,751 | B1 * | 5/2001 | Arrow et al. .................. | 726/15 |
| 6,233,234 | B1 * | 5/2001 | Curry et al. .................. | 370/356 |
| 6,697,864 | B1 * | 2/2004 | Demirtjis et al. ............ | 709/229 |
| 6,781,982 | B1 | 8/2004 | Borella et al. | |
| 7,181,766 | B2 * | 2/2007 | Bendinelli et al. ............ | 726/15 |
| 7,373,661 | B2 * | 5/2008 | Smith et al. .................. | 726/15 |
| 7,441,043 | B1 * | 10/2008 | Henry et al. ................. | 709/238 |
| 7,644,171 | B2 * | 1/2010 | Sturniolo et al. ............ | 709/230 |
| 7,778,199 | B2 * | 8/2010 | Booth et al. .................. | 370/254 |
| 7,954,087 | B2 * | 5/2011 | Zenz et al. .................... | 717/121 |

(Continued)

FOREIGN PATENT DOCUMENTS

EP    1 434 406 A2    6/2004

(Continued)

*Primary Examiner* — Asad Nawaz
*Assistant Examiner* — Wutchung Chu
(74) *Attorney, Agent, or Firm* — Sughrue Mion, PLLC

(57) ABSTRACT

A local network connecting system includes a first local network, a second local network, a mobile terminal. The first local network is connected with a gateway and a first server assigned with a first local address. The second local network is connected with a second server. The mobile terminal VPN "Virtual Private Network"-connect to the second server through the first local network. The gateway provide mapping of local address for a terminal connected to the first local network. When a packet is sent to the first server from mobile terminal, the mobile terminal assigns a second local address unused over the VPN-connection to a destination address of the packet instead of the first local address, and transmits the packet to the gateway. The gateway translate the second local address into the first local address as destination address of the packet, and transmits the packet to the first server based on the translated destination.

10 Claims, 12 Drawing Sheets

U.S. PATENT DOCUMENTS

| | | | |
|---|---|---|---|
| 2002/0112076 A1* | 8/2002 | Rueda et al. | 709/245 |
| 2002/0186698 A1 | 12/2002 | Ceniza | |
| 2003/0152068 A1* | 8/2003 | Balasaygun et al. | 370/356 |
| 2003/0158962 A1 | 8/2003 | Keane et al. | |
| 2004/0037260 A1* | 2/2004 | Kakemizu et al. | 370/338 |
| 2004/0037268 A1* | 2/2004 | Read | 370/352 |
| 2004/0083290 A1* | 4/2004 | Chen et al. | 709/227 |
| 2004/0171402 A1* | 9/2004 | Tamaki et al. | 455/522 |
| 2005/0213574 A1* | 9/2005 | Yoshimura et al. | 370/389 |
| 2006/0203820 A1* | 9/2006 | Coluccio | 370/392 |
| 2007/0053328 A1* | 3/2007 | Riittinen et al. | 370/338 |
| 2008/0261632 A1* | 10/2008 | Hind et al. | 455/466 |
| 2009/0031404 A1* | 1/2009 | Bazzinotti et al. | 726/6 |

FOREIGN PATENT DOCUMENTS

| | | |
|---|---|---|
| JP | 2001-148718 A | 5/2001 |
| JP | 2001-345843 A | 12/2001 |
| JP | 2002-77275 A | 3/2002 |
| JP | 2002-335273 A | 11/2002 |
| JP | 2003-188901 A | 7/2003 |
| JP | 2004-104699 A | 4/2004 |
| JP | 2004-229299 A | 8/2004 |

* cited by examiner

Fig. 3

| ADDRESS CORRESPONDENCE | ADDRESS VALUE | DESTINATION ADDRESS VALUE |
|---|---|---|
| | 10.0.0.102 | 10.0.0.2 |
| | 10.0.0.103 | 10.0.1.1 |
| | ... | ... |

Fig. 5

| USER ADDRESS | 10.0.1.12 | | | | | |
|---|---|---|---|---|---|---|
| ADDRESS CORRESPONDENCE | RECEPTION DESTINATION VALUE | TRANSLATION VALUE | | ... | | |
| | 10.0.0.102 | 10.0.0.2 | | ... | ... | ... |
| | 10.0.0.103 | 10.0.1.1 | | ... | ... | ... |
| | ... | ... | | | | |

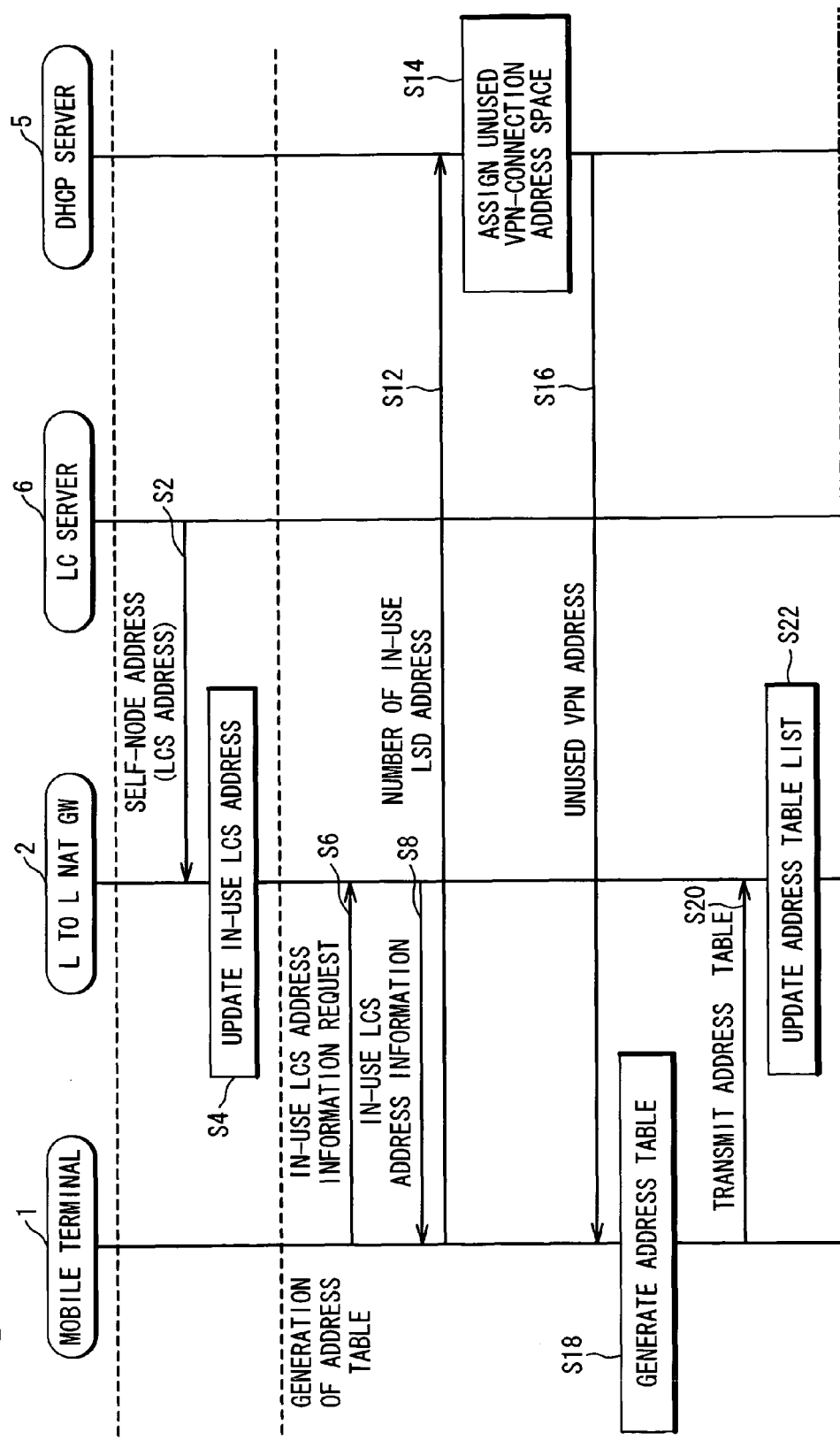

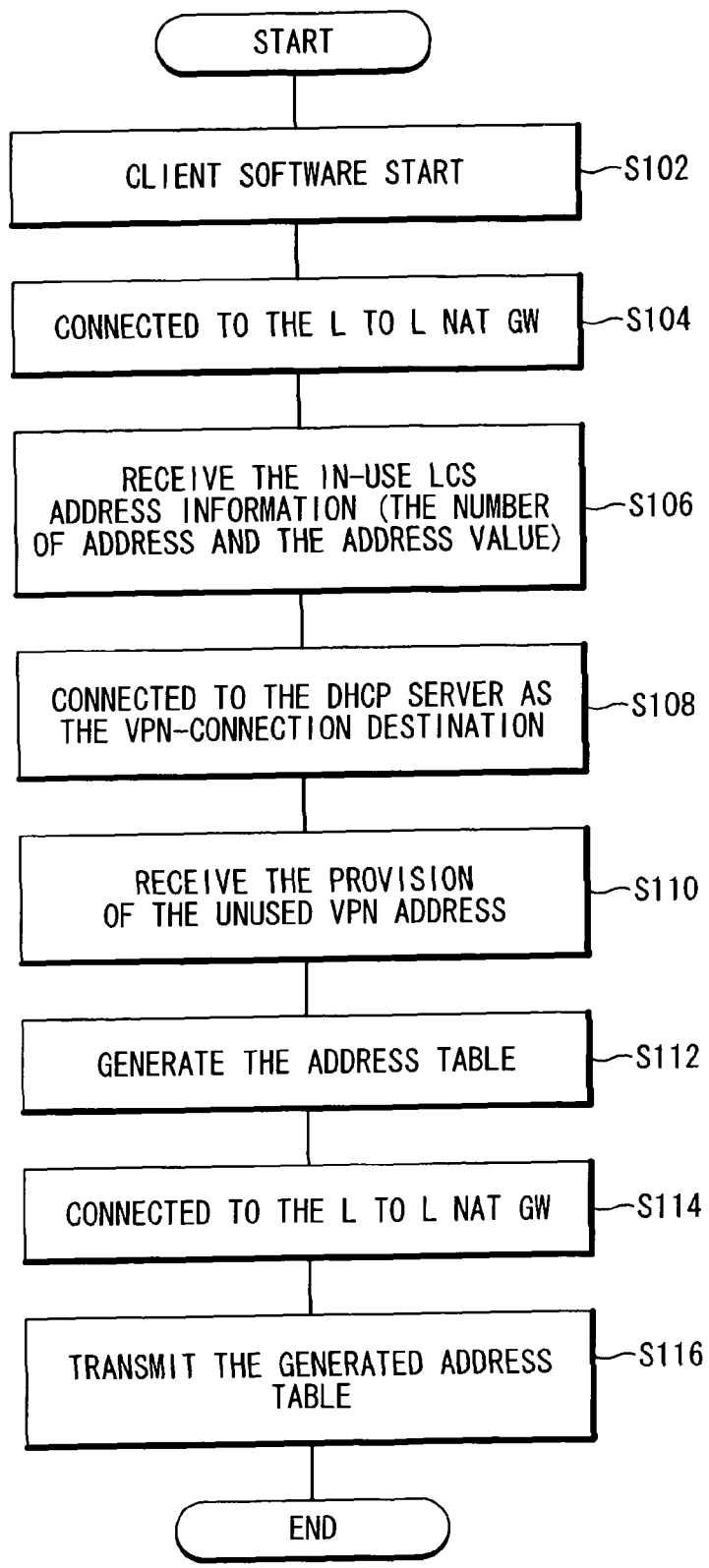

LOCAL NETWORK CONNECTING SYSTEM LOCAL NETWORK CONNECTING METHOD AND MOBILE TERMINAL

BACKGROUND OF THE INVENTION

1. Field of the Invention

The present invention relates to a network connecting system, a mobile terminal, and a network accessing method. More particularly, the present invention relates to a local network connecting system, a mobile terminal, and a local network connecting method, in which a mobile terminal is VPN-connected to the local network through another local network.

2. Description of the Related Art

Conventionally, as a content access service of a packet switching type, there are an Internet access, a content access based on a local address, a VPN access for a connection to a remote site through tunneling and the like. The local content access is the type, for example, such as a so-called intranet in which an user in a company accesses a local server by a local address. Conventionally, there are many examples of company network connections. On the other hand, as the VPN access, there is an example of accessing a company server from outside the company. Also in this case, similarly to the local content access, using the local address to carry out a communication.

Japanese Laid Open Patent Application (JP-P2004-104699A) discloses a network system in which an electronic content table terminal installed in LAN (Local Area Network) transmits a data based on a local address assigned to an electronic content table server within a first network address.

Japanese Laid Open Patent Application (JP-P2004-104699A) discloses the system in which a KARAOKE delivery network is used as an example, and the electronic content table terminal is connected to a delivery sever installed at a center by VPN connection using the local address, and simultaneously even is connected to a branch of electronic content table server using another local address. This disclosed example is the system limited network for the KARAOKE delivery system. That is, since the destination local addresses for the VPN and for the direct connection are set for a router, the addresses for both of them are always different values.

Japanese Laid Open Patent Application (JP-P2002-335273A) discloses a remote maintenance method, in which a maintaining center in a VPN assigns a global address with a terminal, that is in a local network and can VPN-connect to another local network, as a VPN NAT (Network Address Translation) local IP address. Since NAT is established in a local network of the destination, the terminal can be VPN-connected to local network via the NAT using the VPN NAT local IP address.

Japanese Laid Open Patent Application (JP-P2004-229299A) discloses a network connecting apparatus for preparing and assigning a local address that is not used to the network, if duplicate network addresses are assigned in a plurality of local networks connected to each other.

In Japanese Laid Open Patent Application (JP-P2004-229299A), home gateways are installed in a plurality of local networks, and they assign new local addresses. For this reason, as the number of the local networks which are connected to the home gateways is increased, the number of the local address pools to be newly prepared in order to avoid the duplication is decreased, and there is a possibility that the connection becomes finally impossible.

In Japanese Laid Open Patent Application (JP-P2001-148718A), dissemination server is installed in a computer network, the dissemination server manages a address list describing in-use address in the network. When a terminal obtains a network address, the terminal obtains unused address in the network from the dissemination server.

In Japanese Laid Open Patent Application (JP-P2001-345843A), IP connection controller has a table describing a relation of a ID of a local network and network address for virtual excusive path. The controller routs a packet to virtual excusive path accordance with their ID based on the table. And IP network terminal send the packet received from the controller to a local network corresponding to the path.

In Japanese Laid Open Patent Application (JP-P2002-77275A), A system transmits a packet received from an identifiable closed network to another network. It provide for a routing table describing relation of ID of the closed network and IP address assigned with the closed network. It determines a destination of a packet based on the table.

In Japanese Laid Open Patent Application (JP-P2003-188901A), A NAT router has a NAT table describing a relation of a global address and a local address of a host computer in a second network. A DNS for VPN has an information of a name and the local address of the host computer. When a terminal in a first network send packet to the host computer, it sends a name of the host computer to the DNS and obtains the global address based on the name from the NAT router.

Conventionally, when the local content access and the VPN access are carried out through the same local network, since both of destination servers have no relation to each other, they may accidentally have the same local address. For this reason, when the user uses any one of the services and desires to start a communication with a partner of this address, the destination of the packet passed to an IP stack of a kernel from an application is judged only in accordance with a destination address value. It cannot be judged to send To which interface of the VPN connection and the local server connection.

On the other hand, conventionally, as the content accessed based on a local address (hereafter, referred to as local content), there are many examples of the connections to the network at the companies. However, there is a possibility where the utilization of a different local content is popular in future. That is, in the conventional case, the local content installed in a local network for established the Internet connection for example, PPP (Point to Point Protocol)—connection network, a packet network of a 3G (3 Generation) cellular, and a hot spot in a radio LAN, the local contents are installed in various networks that exist on the way to the entrances of the Internet. For example, a 3G cellular network provides a service of connection to the Internet through RAN (Radio Access Network) and CN (Core Network). However, a request to establish the content specialized for each area and attain a profit is generated even in the entrepreneur of a RAN or a CN established for a carrier or a hot spot. In this case, the scene where the local content is used while the VPN accessing is increased. Thus, It is increased problems to use the same local address of the VPN access and using of the local content.

SUMMARY OF THE INVENTION

It is therefore an object of the present invention to provide: a local content connecting system where a mobile terminal in a VPN service can carry out an access to a content in a local network, which is passed through, at a time of a VPN connection and a VPN access at the same time; a mobile terminal; and a local content connecting method.

According to the local network connecting system, the local network connecting method, the mobile terminal that are based on the present invention, the mobile terminal can access to the VPN and access to the content based on a local address in the local network which is passed through at the time of the VPN connection.

In the present invention, a local network connecting system includes a first local network, a second local network, a mobile terminal. The first local network is connected with a gateway and a first server assigned with a first local address. The second local network is connected with a second server. The mobile terminal VPN "Virtual Private Network"-connect to the second server through the first local network.

The gateway provide mapping of local address for a terminal connected to the first local network. When a packet is sent to the first server from mobile terminal, the mobile terminal assigns a second local address unused in the VPN-connection to a destination address of the packet instead of the first local address, and transmits the packet to the gateway. The gateway translate the second local address into the first local address as destination address of the packet, and transmits the packet to the first server based on the translated destination.

As mentioned above the mobile terminal according to the present invention can access the provide for the first server, by the address that does not overlap with the address of the connection of the connection destination. Thus, even the same address value using in the second server and the first server, the mobile terminal can access to the first server and the second server using VPN-connection through the first local network. Since, the mobile terminal use unused address in the VPN-connection, there is no fear that the local address pool is exhausted.

The local network connecting system according to present invention preferably includes DHCP "Dynamic Host Configuration Protocol" server connected to said second local network. DHCP server assigns an address pool unused in the VPN-connection to the mobile terminal.

The gateway sends the first local address to the terminal. The mobile terminal acquires the second local address from the unused address pool, and generates an address table describing a relation of the second local address and the first local address, and sends the address table to the gateway.

The mobile terminal assigns the second local address to the destination address of the packet instead of the first local address based on the address table, and transmits the packet to the gateway as a portal in the first local network.

The gateway translates the second local address into the first local address as a destination address of the packet based on the address table, and transmits the packet to the first server based on the translated destination.

As mentioned above, the mobile terminal and the portal gateway in the first local network has same address table describing a relation of an in-use address in the first local network and unused address in VPN-connection.

DHCP server according to present invention preferably assigns address pools unused in the VPN-connection as many as the number of in-use local address over the first local network. The mobile terminal acquires the number of in-use addresses over the first local network from the gateway. And the mobile terminal transmits the number to the DHCP server through the VPN.

The DHCP server assigns the number of local address spaces unused in the VPN-connection to the mobile terminal. The mobile terminal acquires the second local address from the unused address pool accordance with the local address spaces.

Thus, in the local network connecting system according to present invention, the mobile terminal just acquires local address of necessity for connection to the first server. It brings in efficient use of local address.

And, in the local network connecting system according to present invention, the gateway transmit a packet received from the mobile terminal to the second server thorough the VPN, when a destination address of the packet assigned address of the second server. Thus, the mobile terminal can VPN-connect to the second server through the first local network.

BRIEF DESCRIPTION OF THE DRAWINGS

FIG. 3 is a structure diagram showing an address table according to an embodiment of the present invention;

FIG. 5 is a structure diagram showing an an address table list according to an embodiment of the present invention;

FIGS. 6A and 6B are sequence diagrams showing a local network connecting operation of the local content connecting system according to an embodiment of the present invention;

FIG. 7 is a flowchart showing an address table generating process of a client program according to an embodiment of the present invention;

DESCRIPTION OF THE PREFERRED EMBODIMENTS

Hereinafter, a local network connecting system according to the present invention will be described below with reference to the attached drawings In the local network connecting system according to an embodiment of the present invention, a user terminal 1 of a remote access type can be connected with VPN connection through the Internet 300 and access the local content of a server with a same local address as a local address used in the VPN connection. In the following description, the local network connecting system will be described by using as an example, a case where a user visits a company and accesses a network of a self-company to which the user belongs, through VPN connection, by using a network of the visiting company which is connectable to the Internet, and the user 1 uses a local content provided by a local content (LC) server on the network of the visiting company.

Figure 1:
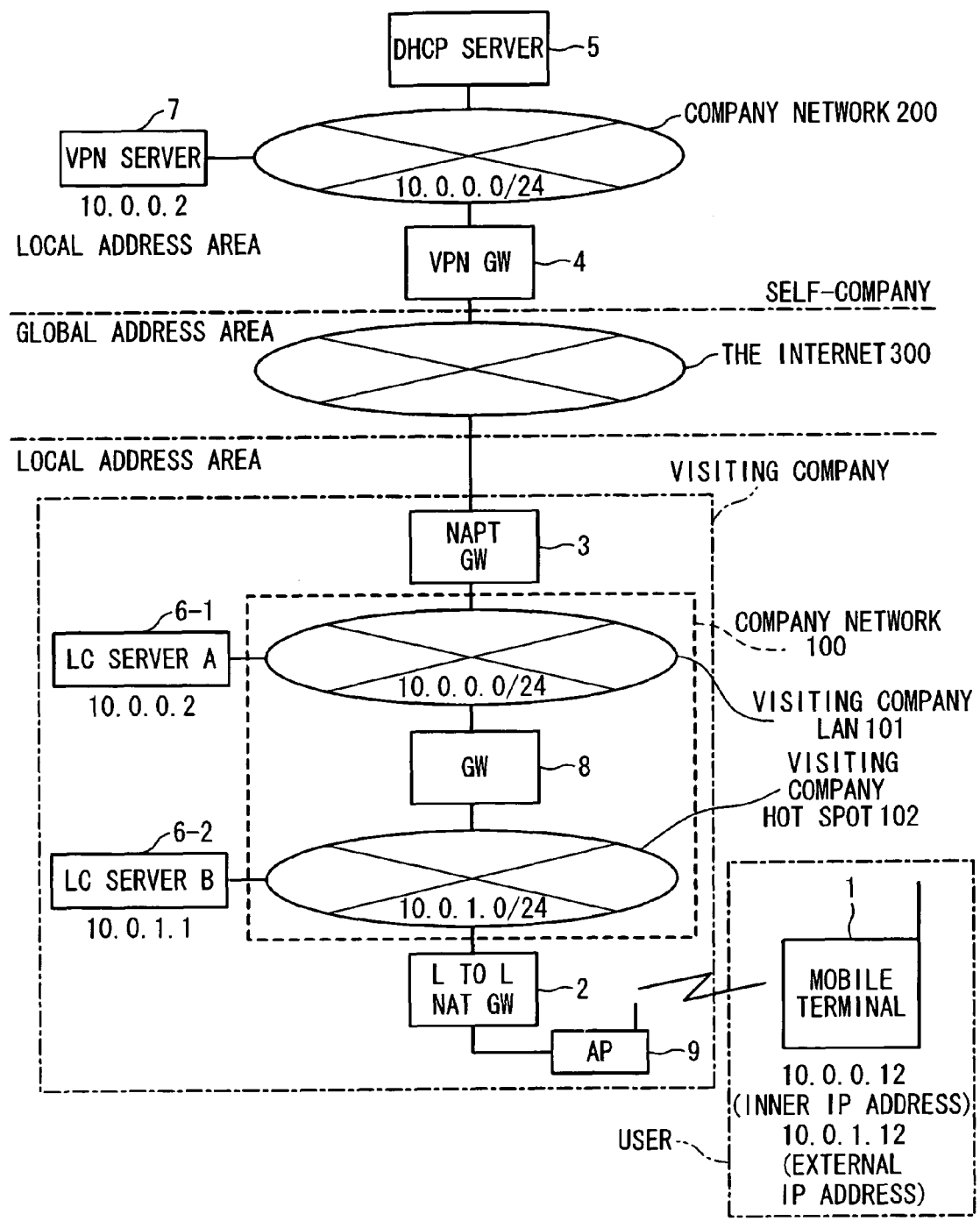
FIG. 1 is a block diagram showing a configuration of a local content connecting system according to an embodiment of the present invention.

Referring to FIG. 1, the configuration of the local network connecting system according to the present invention will be described. The local network connecting system of the present invention includes a mobile terminal 1 functioning as a client of a remote access type VPN, the company network 100 as a local network having the local content server (LC sever) 6, the Internet 300, and the self-company network 200 establishing the VPN. The company network 100 and the self-company network use local addresses independently. The mobile terminal 1 can access the self-company network 200 through VPN connection and the Internet and also can be connected to the LC server 6 on the company network 100 to access the local content.

The company network 100 includes a visiting company LAN 101 and a visiting company hot spot 102 which are managed as a subnet by the visiting company. The company LAN 101 and the company hot spot 102 are connected through a gateway (GW) 8. The company LAN 101 is connected to Network Address Port Translation Gateway (NAPT GW) 3 as a gateway node connected to the Internet 300, and the NAPT GW 3 carries out address translation between a global address and a local address. The company hot spot 102 accommodates the mobile terminal 1 through a radio LAN access point (AP) 9. The company hot spot 102 is connected to the AP 9 through an L-to-L NAT GW 2 (hereafter, referred as NAT GW 2) which maps an address on the company network 100. The company LAN 101 and the company hot spot 102 contain an LC server A6-1 and an LC server B6-2 for providing the local contents, respectively. The LC server 6 is a server having unique contents set up by the visiting company. It should be noted that the number of LC servers 6 connected to the respective subnets is not limited to one, and there may be always a plurality of LC servers 6.

The self-company network 200 is a local network of the self-company to which the user of the mobile terminal 1 belongs and can be connected to the mobile terminal 1 by VPN connection through a VPN GW 4 and the Internet 300. The company network 200 contains a dynamic host configure server (DHCP server) 5 and a VPN server 7 connected with the mobile terminal 1 by VPN connection.

The side of the Internet 300 from the NAPT GW 3 and the VPN GW 4 is a global address area where global addresses are used, or the global addresses space is assigned). The company network 100 and the company network 200 are local address areas where the local addresses are used, or the local address space is assigned. An assigned address of the company LAN 101 is (10. 0. 0. 0/24), that of the company hot spot 102 is (10. 0. 1. 0/24), and that of the company network 200 is (10. 0. 0. 0/24). The addresses of the LC server A6-1 and the LC server B6-2 are (10. 0. 0. 2) and (10. 0. 0. 1), respectively. The address of the VPN server 7 is (10. 0. 0. 1). The mobile terminal 1 uses the address pool of the company network 200 from the DHCP server 5, to receive the provision of internal address (10. 0. 0. 12). Also, at the time of the connection to the company network 100, the mobile terminal 1 receives the provision of an external IP address (10. 0. 1. 12) from the company hot spot 102.

Figure 9:
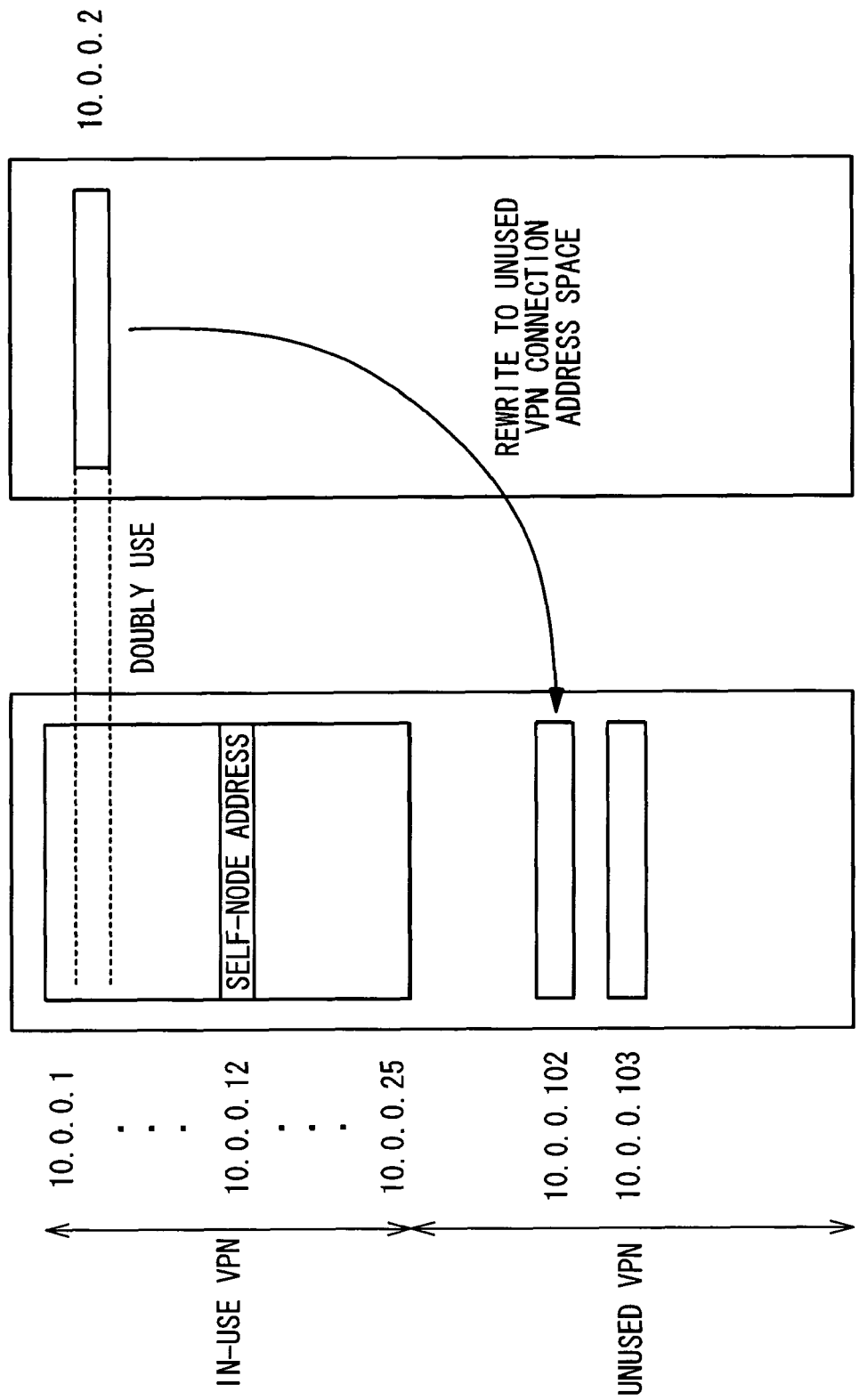
FIG. 9 is a conceptual diagram showing an address space assignment and an address duplication avoidance in a local content connecting system according to an embodiment of the present invention.

With reference to FIG. 9, the DHCP server 5 according to the present invention delivers local addresses for the VPN connection used in the company network 200, and recognizes a state of the local addresses for the local contents possible to be used by the mobile terminal 1. Then, the DHCP server 5 assigns the local address space to the local addresses unused for the VPN connection. The number of unused local address is equal to the number of used addresses 54 for the VPN connection (hereafter, referred to as "in-use local content space (LCS) address number 54) transmitted from the mobile terminal 1, and provides as an address pool to the mobile terminal 1.

Figure 2:
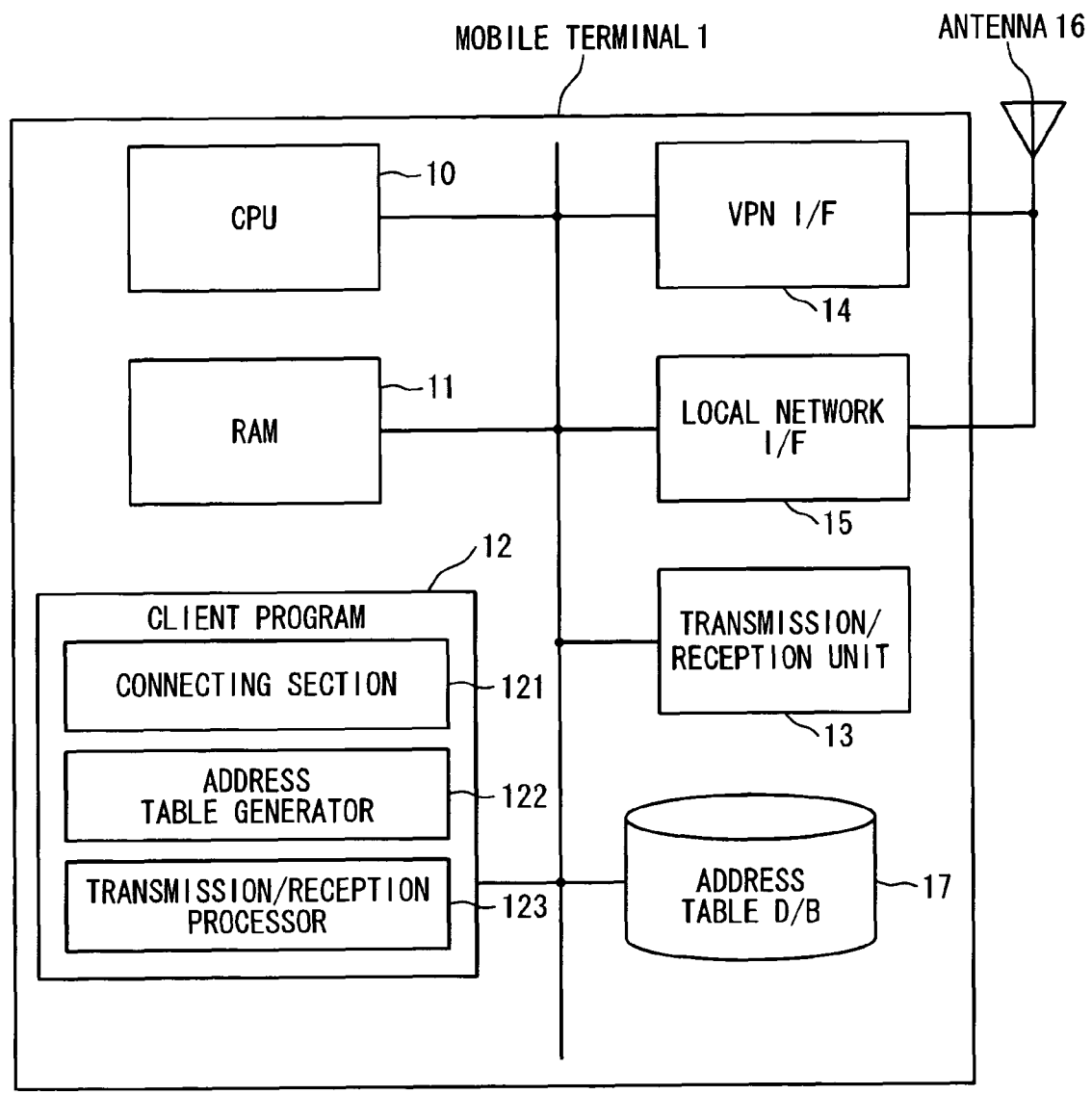
FIG. 2 is a block diagram showing a configuration of a mobile terminal according to an embodiment of the present invention.

FIG. 2 is a block diagram showing the configuration of the mobile terminal 1. The mobile terminal 1 includes a CPU 10, a RAM 11, a client program 12 stored in a storing device such as a memory, a transmission/reception unit 13, a VPN I/F 14, a local network I/F 15, an antenna 16 and an address table database (address table D/B) 17, and they are connected to each other through a bus.

The CPU 10 executes processes in accordance with the client program 12, and carries out various processes for data and signals in the mobile terminal 1. The RAM 11 temporarily stores the signals and data required by the CPU 20. The client program 12 has a connecting section 121, an address table generating section 122 and a transmission/reception processing section 123. When the local content of the company network 100 is used, the CPU 10 executes the connecting section 121 to carry out a connecting process to the NAT GW 2 as a portal site for the user terminal 1 through AP 9 and the Local network I/F 15. Also, when mobile terminal 1 is connected to the company network 200 by using VPN connection, the CPU 10 executes the connecting section 121 to carry out a connecting process with the DHCP server 5 through the VPN I/F 14 and to receive unused addresses for the VPN connection. The CPU 10 executes the address table generating section 122 to generate an address table in which an in-use local address (in-use LCS address) that is being used by the LC server 6 in the company network 100 and the unused address for VPN connection (hereafter, to be referred to as "VPN connection address") that is provided by the DHCP server 5 are related to each other. With reference to FIG. 3, in the address table, an unused VPN connection address provided or obtained from the DHCP server 5 as an address value and an in-use LCS address of the LC server 6 as a destination address value are related to each other, and the address table is stored in the address table D/B 17. When a packet is transmitted from the mobile terminal 1 to a VPN server 7 in the company network 200, the CPU 10 executes the transmission/reception processing section 123 to define the address (for example, 10. 0. 0. 2) of the VPN server 7 as a destination address, and to assign it to a packet header. Also, when a packet is transmitted to the LC server 6 in the company network 100, the CPU 10 refers to the address table in the address table D/B 17, and defines an address value corresponding to an destination address value of the LC server 6 as a destination address, and then assigns it to the packet header. For example, with reference to FIG. 3, (10. 0. 0. 102) corresponding to (10. 0. 0. 2) is assigned as the destination address.

The transmission/reception unit 13 refers to the packet header of the packet to be transmitted, to select whether the packet should be transmitted by using the VPN connection or local network connection, and then transmits the packet through the VPN I/F 14 or through the local network I/F 15. In case of the VPN connection, the transmission/reception unit 13 designates the internal address (10. 0. 0. 12) as a source address of the packet and sends to the VPN I/F 14. The VPN I/F 14 capsules the packet by assigning a global address of the VPN GW 4 as the destination address and the external address (10. 0. 1. 12) as the source address, and then transmits the capsulated packet through the antenna 16, the AP 9 and the NAT GW 2 to the company network 200. In case of the local network connection, the transmission/reception unit 13 designates the external address (10. 0. 1. 12) as the source address of the packet and transmits to the local network I/F 15. The local network I/F 15 transmits the packet to the NAT GW 2 through the antenna 16 and the AP 9 in accordance with the destination address of the packet.

Figure 4:
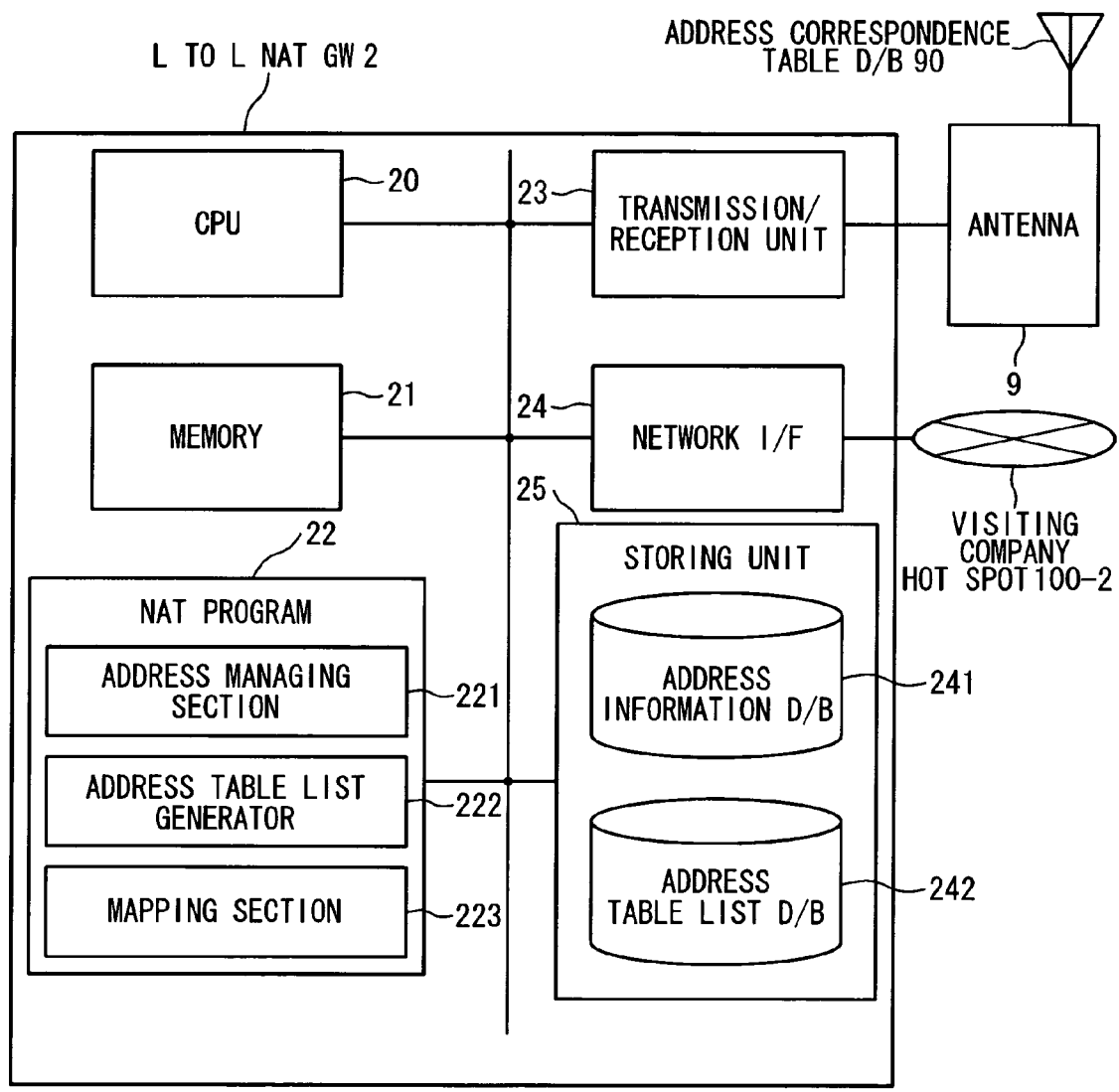
FIG. 4 is a block diagram showing a configuration of L-to-L NAT GW (Local to Local Network Address Translation Gateway) according to an embodiment of the present invention.

FIG. 4 shows the configuration of the NAT GW 2 according to the present invention. The NAT GW 2 according to the present invention contains a CPU 20, a memory 21, a NAT program 22 stored in a storing unit such as a memory, a transmission/reception unit 23, a network I/F 24 and a storing unit 25, and they are connected to each other through a bus. The storing unit 25 is a storing unit such as a memory, and a hard disc and includes an address information database (address information D/B) 241 and an address table list database (address table list D/B) 242. The address information D/B 241 stores address information indicative of a correspondence relation of a local address value used in the network managed by the NAT GW 2, i.e., the company network 100 in this embodiment and the sever 6 to be used. Also, the address table list D/B 242 stores an address table list indicative of a correspondence relation of the address table received from the mobile terminal 1 and the mobile terminal 1.

The CPU 20 carries out processes for the various data and signals in the NAT GW 2 based on the NAT program 22. The memory 21 temporarily stores the signals and data necessary for the processes by the CPU 20. The NAT program 22 contains an address managing section 221, an address table list generating section 222 and a mapping section 223. The CPU 20 executes the address managing section 221 to collect an in-use LCS addresses being used by the LC server 6 in the company network 100, to count the number of the in-use addresses and then to store them in the address information D/B 241. The CPU 20 executes the address table list generating section 222 to relate the address table received from the mobile terminal 1 with the external address of the mobile terminal 1, to generate the address table list, and then to store it in the address table list D/B 242. With reference to FIG. 5, in the address table list, a user address as the external address of the mobile terminal 1 that is a transmission source of the address table and the address table sent from the mobile terminal 1. At this time, the address value of the address table received from the mobile terminal 1 is stored as a reception destination value, and a transmission destination address value is stored as a translation value. The CPU 20 executes the mapping section 223 to refer to the destination address of the packet received by the NAT GW 2, and to carry out the mapping based on the address table list. The CPU 20 executes the mapping section 223 to refer to the address table list and to refer to the address table for the user address corresponding to the source address of the packet. Then, if the reception destination value and the destination address are coincident with each other, the CPU 20 rewrites the destination address into the translation value corresponding to the reception destination value based on the mapping section 223. Also, if the user address corresponding to the source address of the packet does not exist in the address table, or if the destination address of the received packet is not coincident with the reception destination value, the CPU 20 does not rewrite the destination address of the packet.

The transmission/reception unit 23 is connected to the AP 9 and carries out a transmitting/receiving process of the packet to and from the mobile terminal 1. Also, the transmission/reception unit 23 is connected to the destination hot spot 102 through the network I/F 24 and carries out the transmitting/receiving process of signals and packets to and from the LC server 6 in the company network 100. When the packet is transmitted, the transmission/reception unit 23 transmits the packet to the LC server 6 or the company network 200 as the VPN connection destination through the network I/F 24 in accordance with the destination address of the packet to be transmitted.

The operation of the local network connecting system under the VPN service according to the present invention will be described below with reference to FIGS. 6 to 11.

Figure 6B:
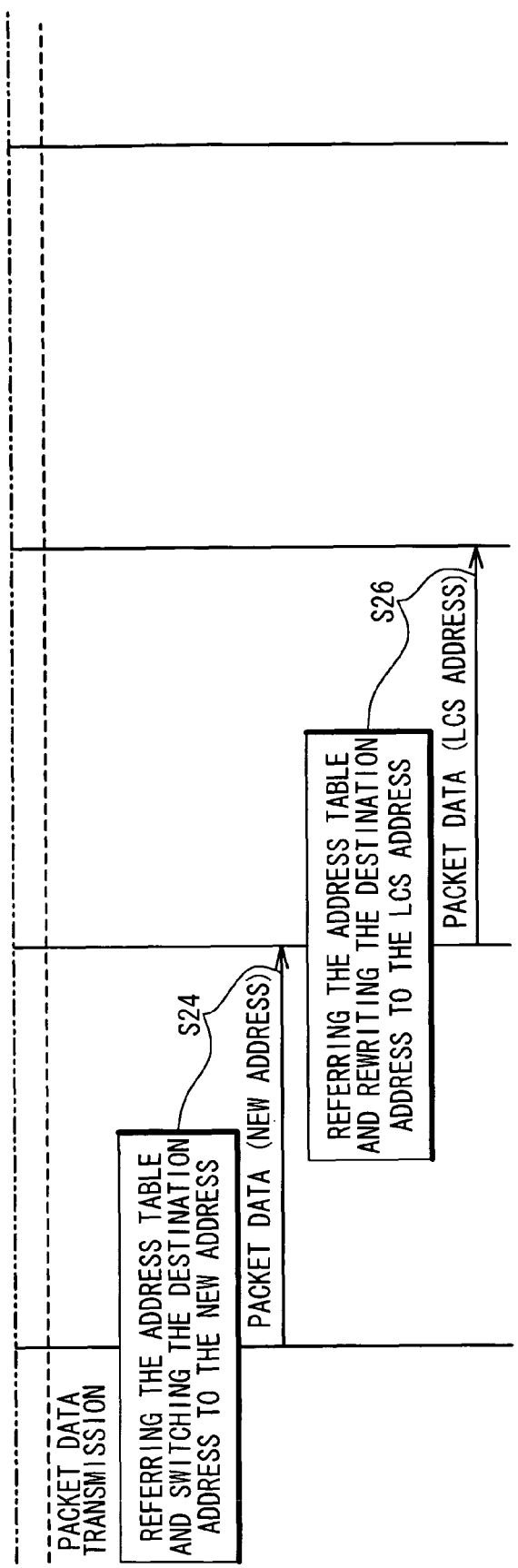

FIGS. 6A and 6B shows the operation sequence of the local network connecting system according to the present invention. In this embodiment, a case will be described in which the mobile terminal 1 is connected to the VPN server 7 in the company network 200 and connected to the LC server A6-1 in the company network 100 and transmits the packet.

[Acquisition of In-Use LCS Address]

The LC server A6-1 and the LC server B6-2 notify local content server address values (LCS address values) as self-node addresses to the NAT GW 2 when they are started (Step S2). The NAT GW 2 counts the number of the notified LCS address values and stores it in the address information D/B 241 together with the LCS address values (Step S4). It should be noted that when addresses are fixedly assigned to the respective LC servers 6, the NAT GW 2t may directly set the addresses in the address information D/B 241.

[Generation of Address Table]

When the mobile terminal 1 uses the local contents in the company network 100, the NAT GW 2 is used as the portal site for the mobile terminal 1. That is, the mobile terminal 1 accesses each LC server 6 by using the NAT GW 2 as a Web portal. At the time of the connection to the NAT GW 2, the mobile terminal 1 issues an in-use LCS address information request to the NAT GW 2 (Step S6). When receiving the in-use LCS address information request, the NAT GW 2 transmits the number of in-use addresses being used by the LC server 6 in the company network 100 and the in-use LCS addresses as the in-use LCS address information to the mobile terminal 1 (Step S8). The mobile terminal 1 transmits the number of in-use LCS addresses received from the NAT GW 2 to the DHCP server 5 in a VPN connection destination site. Also, at this time, the mobile terminal 1 issues an unused VPN address request to the DHCP server 5 (Step S12).

The DHCP server 5 receives the number of in-use LCS addresses assigns an unused VPN connection address spaces as an address space for the local content connection (Step S14). At this time, the unused VPN connection address spaces have the unused addresses of the same number of the number of in-use addresses. With reference to FIG. 9, for example, when the number of in-use LCS addresses has two, namely (10. 0. 0. 2) and (10. 0. 1. 1), the two unused VPN connection address spaces are assigned for (10. 0. 0. 102) and (10. 0. 0. 103) as the address space for the local content connection. Subsequently, when receiving the unused VPN address request from the mobile terminal 1, the DHCP server 5 provides the address pools (10. 0. 0. 102) and (10. 0. 0. 103) to the mobile terminal 1 as the request source based on the assigned VPN connection address spaces. Thus, the mobile terminal 1 obtains the unused VPN connection addresses based on this address pool (Step S16). That is, the address spaces of the two systems for the VPN connection and local content contention are integrated into the VPN connection, and the address value in the address table 17 for the local server connection is rewritten. For this reason, when the address (10. 0. 0. 2) of the VPN server 7 and the address (10. 0. 0. 2) of the LC server A6-1 are overlappingly used, the address of the LC server A6-1 is rewritten into an address of the unused VPN connection address space in the DHCP server 5 (refer to FIG. 9).

The mobile terminal 1 receives the provision of the unused address pool for the VPN connection and generates the address table by relating the unused VPN connection address and the in-use LCS address 53 obtained from the NAT GW 2 (Step S18). Then, the mobile terminal 1 transmits the generated address table to the NAT GW 2 (Step S20). The NAT GW 2 relates the address table transmitted from the mobile terminal 1 and the user address of the mobile terminal 1, and stores or updates as the address table list (Step S22).

FIG. 7 shows an address table generating process of the client program 12 in the mobile terminal 1.

When the mobile terminal 1 is connected to the LC server 6, client program 12 is firstly started (Step S102). The CPU 10 executes the connecting section 121 for the mobile terminal 1 to be connected to the NAT GW 2 serving as the portal site (Step S104). At this time, the mobile terminal 1 receives the provision of the external address (10. 0. 1. 12) from the company hot spot 101 of the connection destination. When the mobile terminal 1 is connected to the NAT GW 2, the CPU 10 executes the address table generating section 122 to issue the in-use LCS address information request to the NAT GW 2, in order to obtain the in-use address information for the local content. The mobile terminal 1 receives the in-use LCS address information indicative of the address value in the company network 100 and the number of addresses from the NAT GW 2 having received the in-use LCS address information request. For example, the mobile terminal 1 receives the address values ((10. 0. 0. 2) of the LC server A6-1 and (10. 0. 0. 1) of the LC server B6-2) and the number of addresses (two) as the in-use LCS address information (Step S106). Next, the CPU 10 executes the connecting section 121 for the mobile terminal 1 to be connected to the DHCP server 5 in the company network 200 by using the VPN connection. The CPU 10 executes the address table generating section 122 to transmit the number of addresses (two) to the DHCP server 5 as the VPN connection destination (Step S108). The CPU 10 executes the address table generating section 122 to issue the unused VPN address request to the DHCP server and to acquire the two address pools, and receives the provision of the unused VPN address. Here, the mobile terminal 1 receives the provisions of (10. 0. 0. 102) and (10. 0. 0. 103) (Step S110). When receiving the unused VPN address, the CPU 10 executes the address table generating section 122 to generate the address table by using the unused VPN address as the address value, and the in-use LCS address 53 as the destination address value (Step S112). With reference to FIG. 3, the address value (10. 0. 0. 102) and the transmission destination address value (10. 0. 1. 1) are related to each other and the address value (10. 0. 0. 103) and the destination address value (10. 0. 1. 1) are related to each other. When the address table is generated, the CPU 10 executes the connecting section 121 for the mobile terminal 1 to be connected to the NAT GW 2 (Step S114) and to transmit the generated address table (Step S116).

Figure 8:
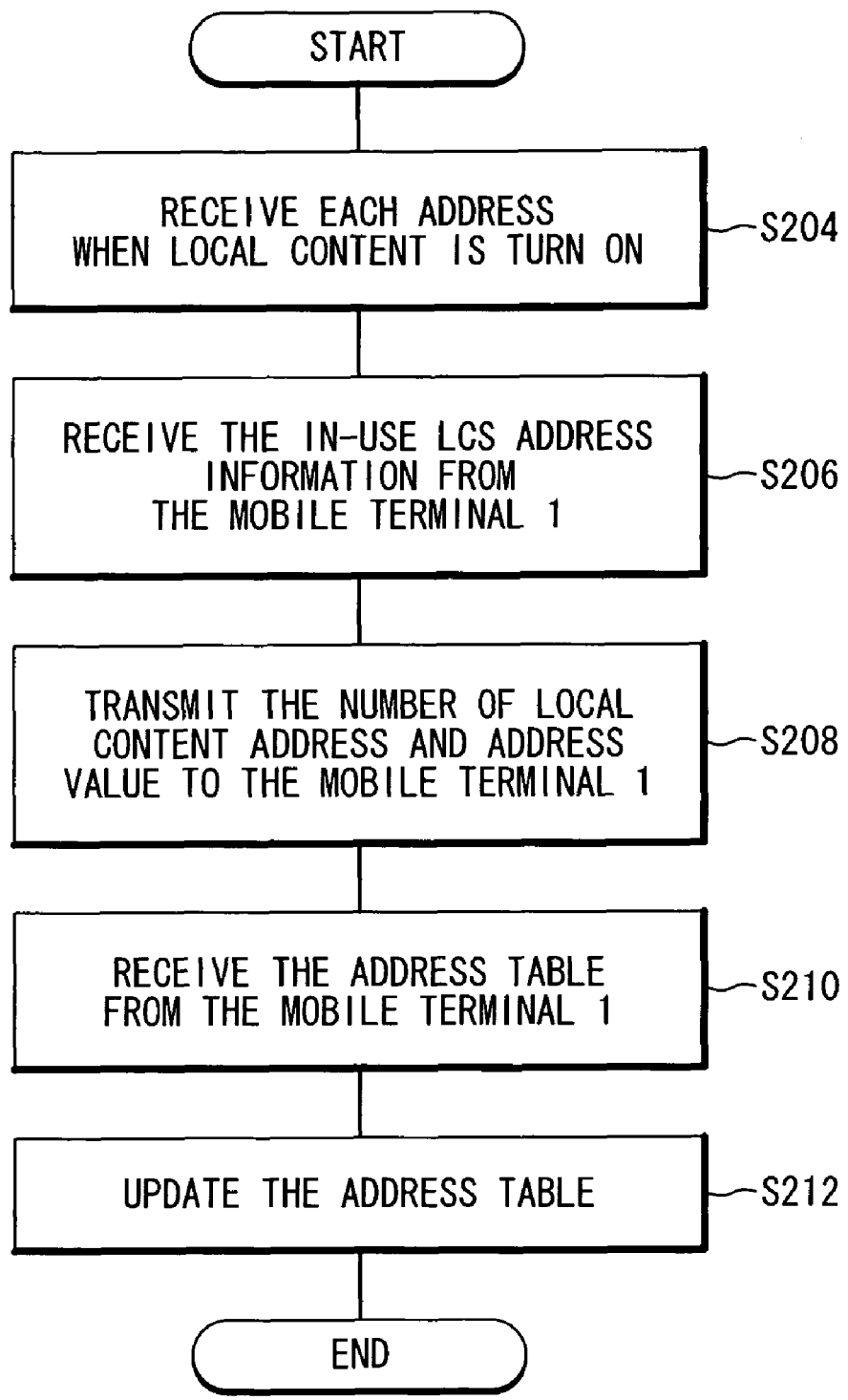
FIG. 8 is a flowchart showing an address table list generating process of a network address-translating program according to an embodiment of the present invention.

FIG. 8 shows the operation of the address table list generating process for the NAT program 22 in the NAT GW 2.

Each of the LC servers 6 in the company network 100 notifies a used address to the NAT GW 2 by use of a control message when a power source is turned on to start the operation. For example, the LC server A6-1 and the LC server B6-2 notify the LCS address values (10. 0. 0. 2) and (10. 0. 1. 1), which are the self-node addresses, to the NAT GW 2. The CPU 20 executes the address managing section 221 of the NAT GW 2 to store the notified LCS address values as the in-use LCS addresses in the address information D/B 241 and to update the in-use LCS address information (Step S204). At this time, the NAT GW 2 counts the number of in-use LCS addresses and stores in the address information D/B 241.

When receiving the in-use LCS address information request from the mobile terminal 1 (Step S6), the CPU 20 executes the address managing section 221 to extract the in-use LCS addresses and the number of in-use LCS addresses from the address information D/B 241 and to transmit them to the mobile terminal 1 (Step S206).

When the address table (refer to FIG. 3) generated in accordance with the in-use LCS addresses is received from the mobile terminal 1 (Step S210), the CPU 20 executes the address table list generating section 222 to relate the received address table to the user address (10. 0. 1. 12) corresponding to the source address of the received packet header, and to store the relation as the address table list in the address table list D/B 242 (Step S212). At this time, the address value and transmission address value in the received address table are related as the reception destination value and the translation value, respectively, and stored (refer to FIG. 5). As mentioned above, the address table for each mobile terminal 1 is updated.

[Packet Data Transmission]

FIGS. 6A and 6B show the operation of the packet transmission to the local content server. A case will be described in which the mobile terminal 1 according to the present invention transmits the packet to the LC server A6-1 (10. 0. 0. 2) in the company LAN 101. When transmitting the packet to the targeted LC server A6-1, the mobile terminal 1 refers to the address table shown in FIG. 3, translates the destination address to an address value (10. 0. 0. 102) and transmits the packet through the NAT GW 2 (Step S26). The NAT GW 2 receives the packet from the mobile terminal 1, refers to the address table list, and rewrites the destination address of the packet to the translation value (10. 0. 0. 2) corresponding to the reception destination value based on the address table for the mobile terminal 1 as the transmission source, and then transmits the packet data to the targeted LC server A6-1 (Step S26).

Figure 10:
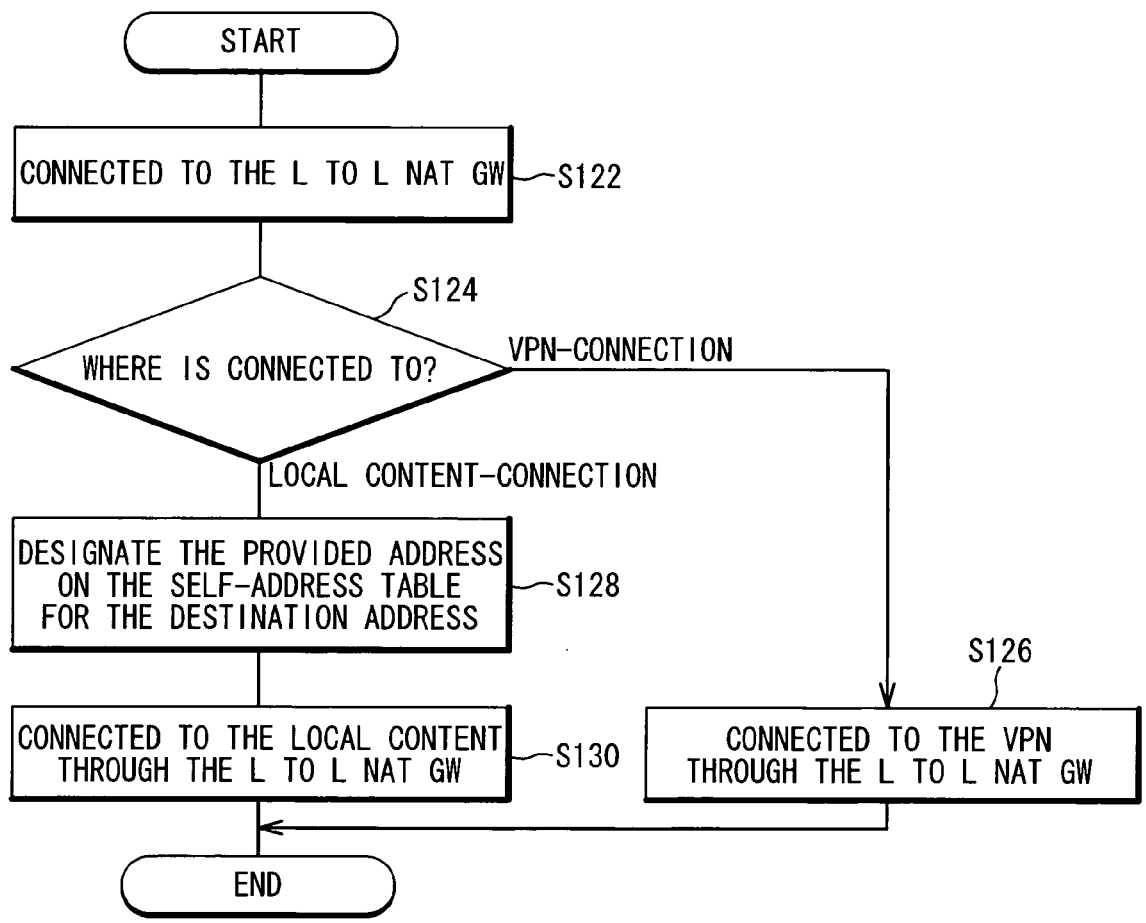
FIG. 10 is a flowchart showing an accessing process of a client program according to an embodiment of the present invention.

FIG. 10 shows the operation of the transmission processing section 123 of the client program 12 in the mobile terminal 1.

When the packet is transmitted to the connection destination, the CPU 10 executes the connecting section 121 of the client program 12 to be firstly connected to the NAT GW 2 (Step S122). After the establishment of the connection, the CPU 10 executes the transmission/reception processing section 123 to check the connection destination of the mobile terminal 1 (Step S124). If the destination is the VPN server 7 (10. 0. 0. 2) in the VPN connection, the address value (10. 0. 0. 2) of the VPN server 7 is specified for the destination address. In this case, the transmission/reception unit 15 designates the internal address (10. 0. 0. 12) as the source address of the packet and transmits the packet to the VPN I/F 14. The VPN I/F 14 designates the external address (10. 0. 1. 12) provided by the company hot spot 101 as the source address and designates the global address of the VPN GW 2 as the destination address, and encapsulates the packet, and then transmits to the VPN server 7 through the NAT GW 2 (Step S126).

At the step S124, if the connection destination is the LC server A6-1 (10. 0. 0. 2), the CPU 10 executes the transmission/reception processing section 123 to extract the address table (refer to FIG. 3) from the address table D/B 17 and to refer to it and then designates the address value (10. 0. 0. 102) corresponding to the transmission destination address value (10. 0. 0. 2) as the destination address (Step S128). The transmission unit 13 designates the external address (10. 0. 1. 12) as the source address and transmits the packet to the NAT GW 2 through the local network I/F 15 (Step S130).

Figure 11:
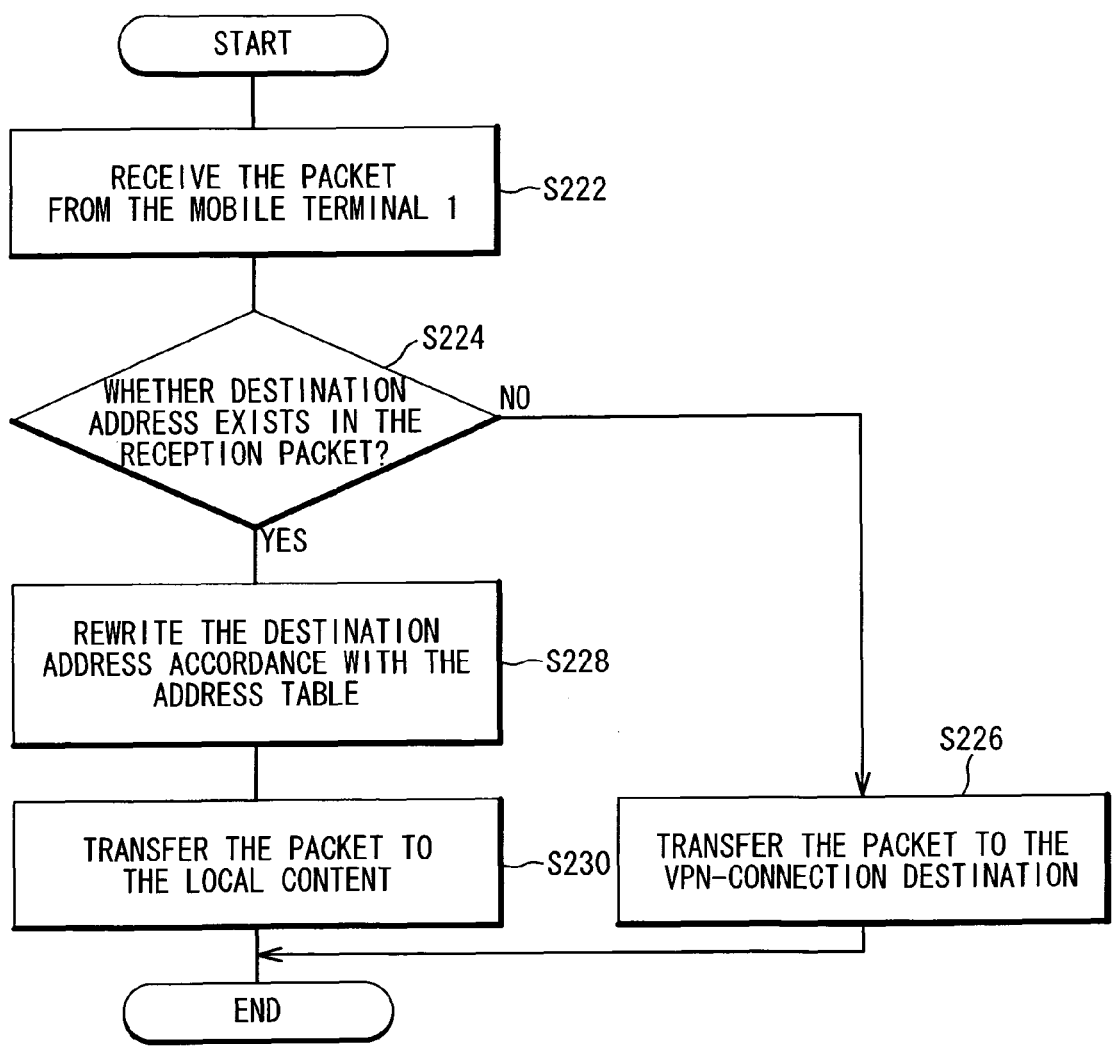
FIG. 11 is a flowchart showing a packet transferring process of a network address-translating program according to an embodiment of the present invention.

FIG. 11 shows the operation of the mapping section 123 of the NAT program 22 in the NAT GW 2.

When the packet is received from the mobile terminal 1 through the AP 9 (Step S222), the CPU 20 executes the mapping section 223 of the NAT program 22 to extract the address table list (refer to FIG. 5) from the address table list D/B 242, to refer to the correspondence relation of the user address coincident with or corresponding to the source address (10. 0. 1. 12), and then to check whether or not the destination address exists in the reception destination value of the address correspondence relation (Step S224). If the destination address is not coincident with the reception destination value (for example, the global address of the VPN GW 4), the CPU 20 executes the mapping section 223 not to rewrite the destination address of the packet and then to transmit to the transmission/reception unit 23. Then, the transmission/reception unit 23 refers to the destination address of the packet (the global address of the VPN GW 4) and transfers to the VPN GW 4 through the Internet 300 (Step S226). Also, if the destination address is coincident with the reception destination value (10. 0. 0. 102), the CPU 20 executes the mapping section 223 to rewrite the destination address of the packet to the translation value (10. 0. 0. 2) corresponding to the reception destination value (10. 0. 0. 102) (Step S228). Then, the transmission/reception unit 23 transmits the packet to the LC server A6-1 through the network I/F 24 in accordance with the destination address (10. 0. 0. 2) (Step S230).

As mentioned above, the mobile terminal 1 according to the present invention can access the content of the local network via a route to the entrance of the Internet 300, based on the address value that does not overlap with the address space of the connection destination. Also, the local network connecting system according to the present invention adopts the method of acquiring the address pool from the VPN connection destination for each mobile terminal 1 and then assigning to the local content. Thus, even under the same address value, the operation is different for each user. Therefore, there is no fear that the local address pool is exhausted.

According to the local network connecting system according to the present invention, the service entrepreneur of the network which provides a pass route to the entrance of the Internet, can provide the access services of the local contents on the company network 200 for the VPN connection and on the company network 100 composed of the company LAN 101 that is the local network and the company hot spot 102, by adding only the client program to the mobile terminal, the NAT GW 2, and the LC server 6 to the existing infrastructure. For this reason, since the new entry impact is small, this leads to the promotion for enlargement of the local content business.

Also, for the network service entrepreneur of the pass route can provide to the user whose main purpose is the Internet connection. Thus, the entire Internet user can be surrounded as the local content using client. That is, in the local network connecting system according to the present invention, mainly, it is enough that the access network entrepreneur installs the NAT GW 2 and the LC server 6, and it is enough that the special software is only installed at the terminal of the user. Hence, as compared with the conventional system cost, the initial infrastructure investment becomes cheap.

As mentioned above, although the embodiments of the present invention have been described in detail, the concrete configuration is not limited to the above-mentioned embodiments. Even the change without departing the spirit and scope of the present invention is included in the present invention. For example, it may be connected through the AP 9 to a public hot spot 100' which is used in an underground shopping mall, a building and the like and has the LC server 6 for providing the various local contents, instead of the company network 100. Also, it may serve as the system for using the content provided by the LC server 6 on a 3G cellular network 100", under the VPN connection through the 3G cellular network 100" connected to the Internet 300. At this case, the 3G cellular network 100" has a CN (Core Network) 101' and a RAN (Radio Access Network) 102'. The mobile terminal 1 accesses to RAN 102' through a radio base station 9' via a 3G-radio communication line such as W-CDMA and the like. Also, the RAN 102' has NAT GW for mapping the addresses on a 3G cellular between it and the base station 9'. The RAN 102 accesses to the CN 101' through a SGSN (Serving GPRS Support Node) 8' and is connected through a GGSN (Gateway GPRS Support Node) 3' to the Internet 300.

What is claimed is:

1. A local network connecting system comprising:
   a first local network comprising a first server assigned with a first local address within the first local network;
   a second local network comprising a second server;
   a mobile terminal; and
   a gateway connected to said first local network,
   wherein said mobile terminal selects a second local address from an unused local address pool of the second local network, assigns the selected second local address as a destination address to a packet to be sent to the first server from the mobile terminal, transmits said packet to said gateway to be transmitted to the first server, wherein a virtual private network (VPN) connection is established between said mobile terminal and said second server through said first local network, and
   said gateway translates said second local address into said first local address as said destination address of said packet, and transmits said packet to said first server based on said translated destination address,
   the local network connecting system further comprising:
   a DHCP (Dynamic Host Configuration Protocol) server connected to said second local network, wherein the DHCP server assigns the unused local address pool to the mobile terminal, the unused local address pool corresponding to an unused address space for said VPN connection,
   wherein said gateway sends said first local address to said mobile terminal,
   said mobile terminal acquires said second local address from said unused address pool, generates an address table describing a relation of said second local address and said first local address, and sends said address table to said gateway,
   said mobile terminal assigns said second local address to a destination address of the packet based on said address table, and transmits said packet to said gateway, and
   said gateway translates said second local address into said first local address as said destination address of said packet based on said address table, and transmits said packet to said first server based on said translated destination address.

2. The local network connecting system according to claim 1, said mobile terminal connected to said gateway, acquires the number of in-use addresses over said first local network from said gateway, and transmits said number to said DHCP server through said VPN,
   said DHCP server assigns said number of local address spaces unused over said VPN to said mobile terminal, and
   said mobile terminal acquires said second local address from said unused address pool based on said local address space, generates an address table describing a relation of said second local address and said first local address, and sends said address table to said gateway.

3. The local network connecting system according to claim 1, further comprising:
   plural mobile terminals,
   wherein said gateway acquires address tables describing relation of said second local address and said first local address from said plural mobile terminals, generates an address table list describing relations of said address tables and said plural mobile terminals, each of said plural mobile terminal assigns said second local address to the destination address of the packet based on said address table, and transmits said packet to said gateway, and said gateway translates said second local address into said first local address as a destination address of said packet based on said address table associated with a source mobile terminal of said packet, and transmits said packet to said first server based on said translated destination.

4. The local network connecting system according to claim 1, wherein said gateway transmits a packet received from said mobile terminal to said second server thorough said VPN, when a destination address of said packet assigned with address of said second server.

5. The local network connecting system according to claim 1, wherein said mobile terminal accesses said gateway as a portal, when said mobile terminal accesses said first local network.

6. A mobile terminal comprising:

an address table database;

a transmission and reception processor; and a transmission and reception unit, wherein said address table database stores an address table describing a relation of a first local address corresponding to a first local server within a first local network and a second local address corresponding to a second local network, the first local network different from the second local network, said transmission and reception processor assigns said second local address to a destination address of a packet based on said address table, and said transmission and reception unit transmits said packet to said first local server via a gateway and specifies the second local address as the destination address of the packet to be transmitted to the first local server, said mobile terminal further comprising:

a connecting section; and an address table generator, wherein said connecting section connects to a DHCP "Dynamic Host Configuration Protocol" server in said second local network through a virtual private network (VPN), and said address table generator acquires an unused address pool corresponding to the second local network from said DHCP server through said VPN, and generates an address table describing a relation of a second local address acquired from said unused address pool and said first local address.

7. The mobile terminal according to claim 6, said transmission and reception processor assigns a local address of said second server to the destination of a packet, and said transmission and reception unit transmits said packet to said second server through said VPN via said gateway.

8. The mobile terminal according to claim 6, wherein the gateway translates said second local address into said first local address as a destination address of said packet.

9. A method of connecting a mobile terminal to a local network, comprising:

transmitting a packet destined to a first server from a mobile terminal to a gateway, the packet sent to a second local address selected from an unused local address pool of a second local network;

translating, by a gateway connected to a first local network, said second local address into a first local address; and transmitting the packet from said gateway to said first server using the first local address as the destination address of the packet;

acquiring the number of in-use local address over said first local network from said gateway; and generating an address table describing a relation of said first local address and said second local address, wherein:

the first local network different from the second local network, said first server is provided for the first local network, and is assigned the first local address within the first local network, a VPN (virtual private network) exists between a second server on said second network and the mobile terminal, and the unused address pool corresponds to an unused VPN address pool, the number of addresses in the unused address pool is at least said number, and said mobile terminal selects said second local address from the unused address pool.

10. The method according to claim 9, further comprising:

acquiring a second local address unused over said VPN from said second local network;

accessing said gateway as a portal in said first local network;

transmitting said address table to said gateway from said mobile terminal;

generating an address table list describing a relation of said address table and said mobile terminal;

said mobile terminal assigning said second local address to destination address of said packet based on said address table;

said gateway translating said second local address into said first local address as a destination address of said packet based on said address table; and said gateway transmitting said packet to said first server based on said translated destination address.

* * * * *